United States Patent
Aderman

(10) Patent No.: US 8,827,781 B2
(45) Date of Patent: Sep. 9, 2014

(54) ANIMAL HOUSE CEILING VENT

(75) Inventor: James Aderman, Altamont, IL (US)

(73) Assignee: The GSI Group, Inc., Assumption, IL (US)

( * ) Notice: Subject to any disclaimer, the term of this patent is extended or adjusted under 35 U.S.C. 154(b) by 1480 days.

(21) Appl. No.: 12/323,216

(22) Filed: Nov. 25, 2008

(65) Prior Publication Data

US 2009/0139154 A1    Jun. 4, 2009

Related U.S. Application Data

(60) Provisional application No. 60/991,493, filed on Nov. 30, 2007.

(51) Int. Cl.
*A01K 1/00* (2006.01)

(52) U.S. Cl.
CPC .................................. *A01K 1/0058* (2013.01)
USPC ........... 454/254; 454/347; 454/348; 454/358; 454/399

(58) Field of Classification Search
CPC .................................................. A01K 1/0058
USPC ......... 454/348, 358, 347, 339, 260, 254, 259, 454/275
See application file for complete search history.

(56) References Cited

U.S. PATENT DOCUMENTS

| | | | | |
|---|---|---|---|---|
| 1,432,135 | A * | 10/1922 | Sylvan | 49/94 |
| 2,183,645 | A * | 12/1939 | Hansen | 454/363 |
| 2,218,926 | A * | 10/1940 | Teichmann | 454/199 |
| 2,897,742 | A * | 8/1959 | Ryburn et al. | 454/363 |
| 3,299,798 | A * | 1/1967 | Nabben | 454/259 |
| 4,201,123 | A * | 5/1980 | Maciag et al. | 454/94 |
| 4,616,560 | A * | 10/1986 | Esposito | 454/341 |
| 5,088,388 | A * | 2/1992 | Schaefer | 454/271 |
| 5,201,685 | A * | 4/1993 | Raisanen | 454/259 |
| 5,236,391 | A * | 8/1993 | Schaefer | 454/253 |
| 5,638,645 | A * | 6/1997 | Lipton | 52/72 |
| 6,435,963 | B1 * | 8/2002 | Dill | 454/292 |
| 6,685,557 | B1 * | 2/2004 | Hoffe | 454/259 |
| 2007/0066206 | A1 * | 3/2007 | Ono et al. | 454/69 |
| 2009/0235916 | A1 * | 9/2009 | Rossetti | 126/292 |

* cited by examiner

*Primary Examiner* — Steven B McAllister
*Assistant Examiner* — Frances H Kamps
(74) *Attorney, Agent, or Firm* — Polster, Lieder, Woodruff & Lucchesi, L.C.

(57) ABSTRACT

A ceiling vent assembly consisting of a pair of opposed end panels and a pair of opposed side panels which defining a frame. At least one louver is pivotally mounted within the frame to be movable between an open position to permit airflow through the vent assembly and a closed position blocking airflow. The louver includes an upper surface defining a curvature and decreases in thickness at an outer edge. When in an open configuration, the louver permits air to pass through the ceiling vent assembly in a directed flow associated with the curvature of the louver upper surface.

19 Claims, 11 Drawing Sheets

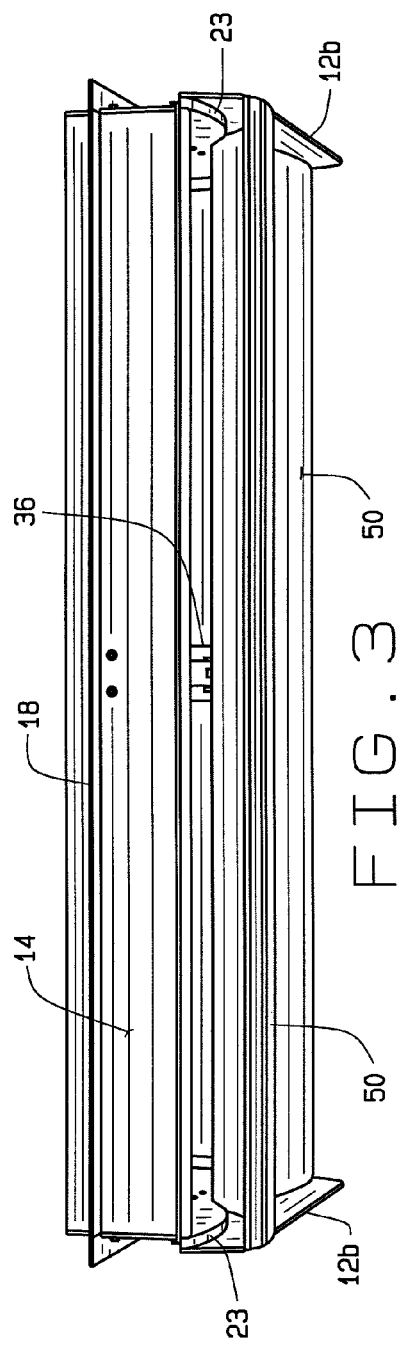
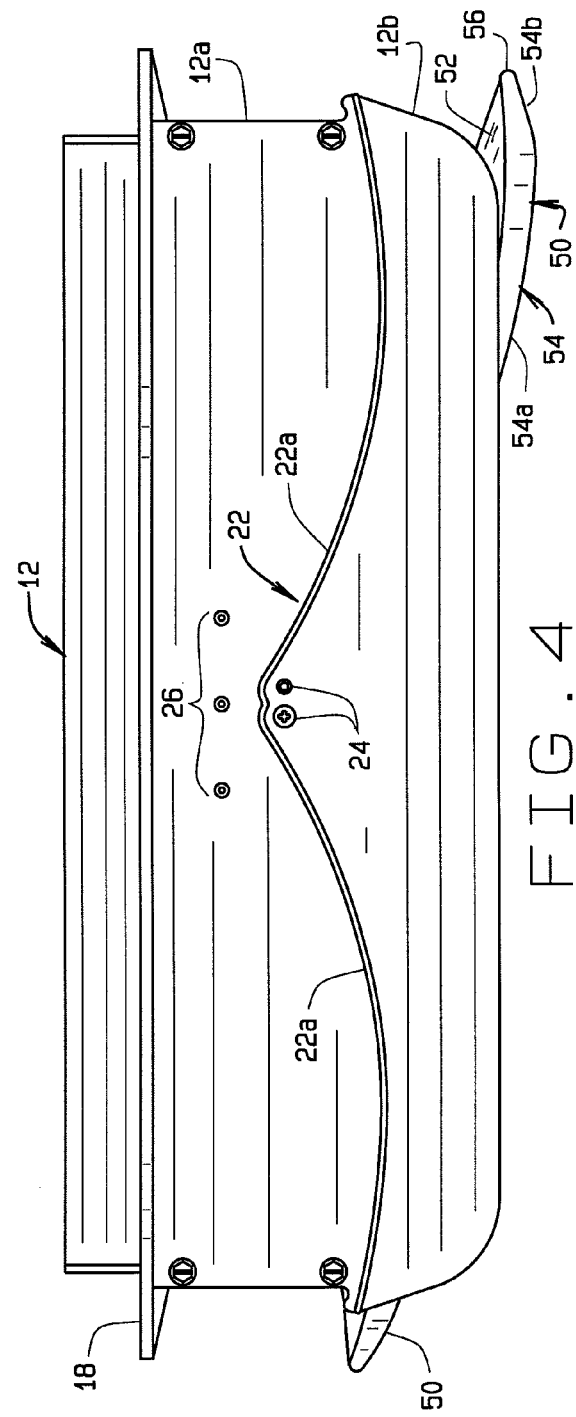

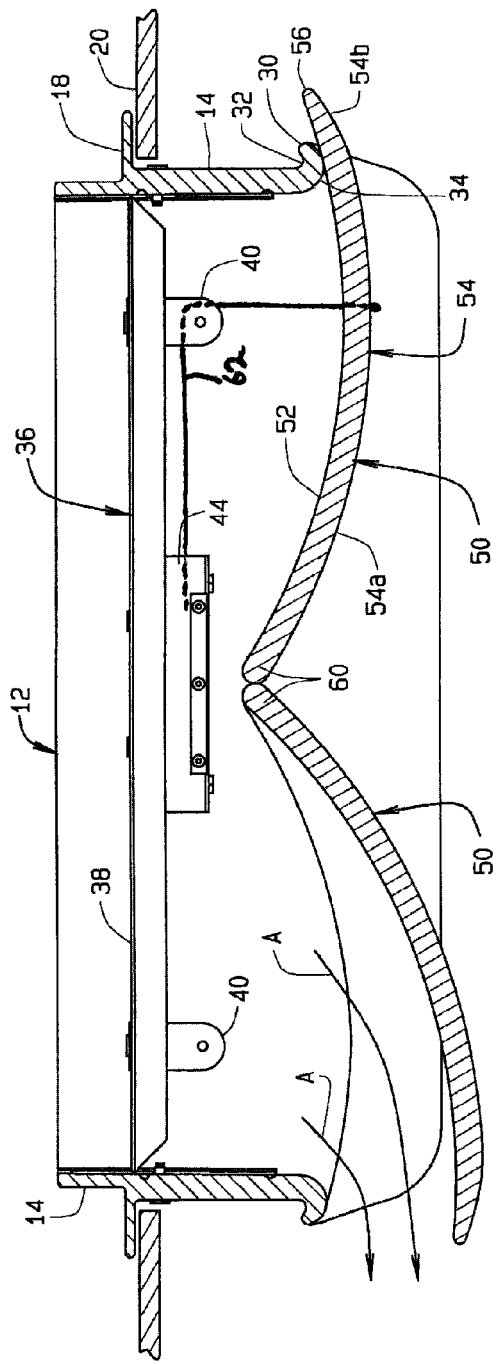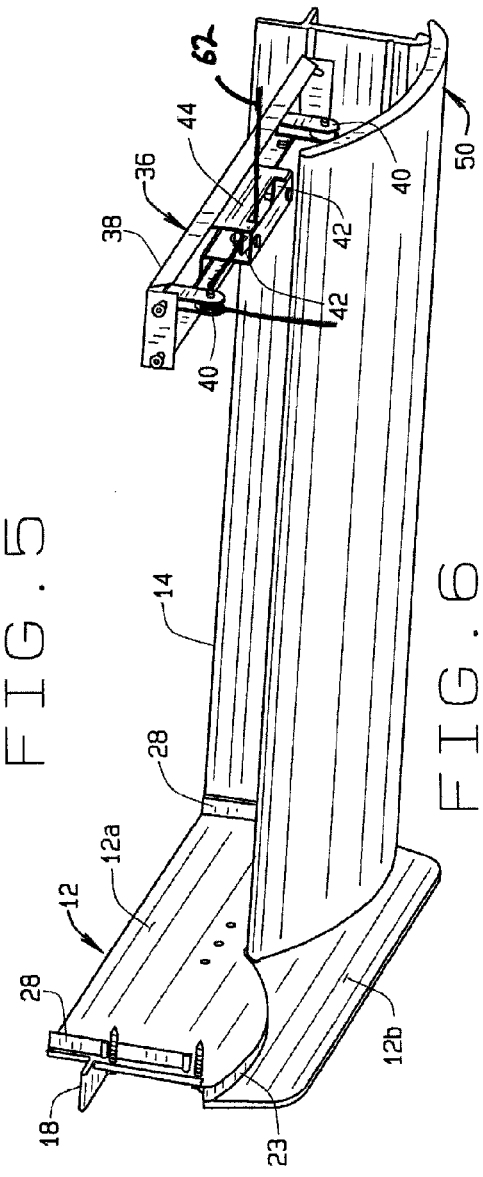

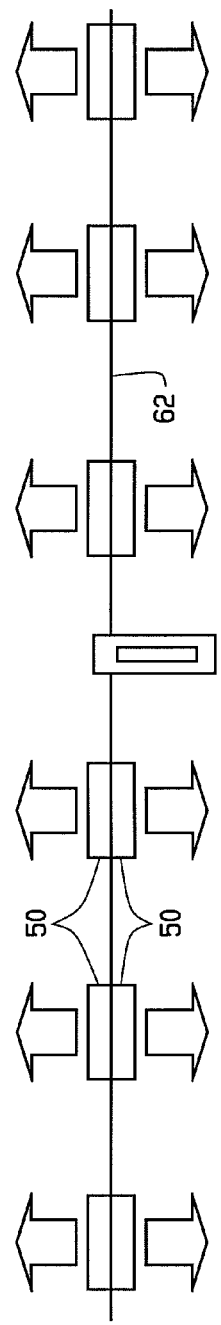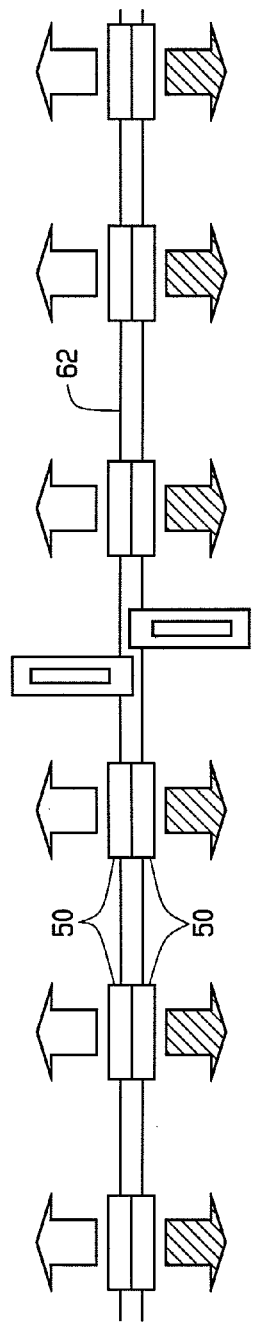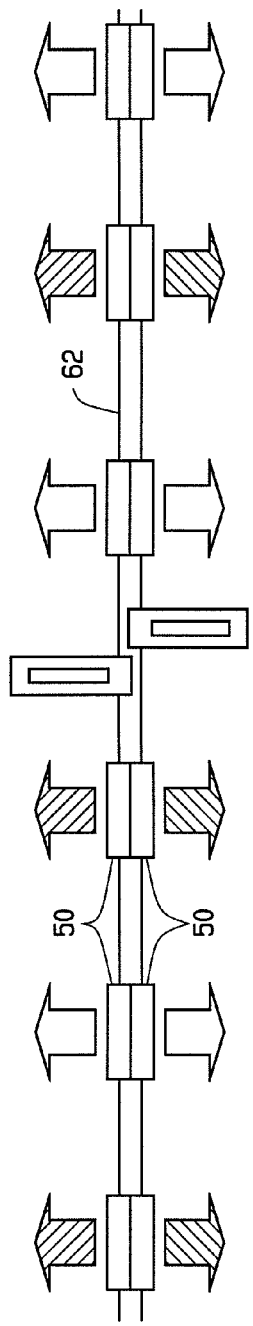

ly stated, the disclosed ceiling vent assembly comprises a pair of opposed end panels and a pair of opposed side panels which define a frame. At least one louver is pivotally mounted within the frame to be movable between an open position to permit airflow through the vent assembly and a closed position blocking airflow. The louver includes an upper surface defining a curvature and decreases in thickness at an outer edge. When in an open configuration, the louver permits air to pass through the ceiling vent assembly in a directed flow associated with the curvature of the louver upper surface.

ANIMAL HOUSE CEILING VENT

CROSS-REFERENCE TO RELATED APPLICATIONS

The present application is related to, and claims priority from, U.S. Provisional Patent Application Ser. No. 60/991,493 entitled "Animal House Ceiling Vent", which was filed on Nov. 30, 2007 by James Aderman, and which is herein incorporated by reference.

STATEMENT REGARDING FEDERALLY SPONSORED RESEARCH

Not Applicable.

BACKGROUND OF THE INVENTION

This application relates to attic or ceiling vents, and, in particular, to a ceiling vent for use in animal houses.

Ceiling vents are often used as part of the ventilation system for an animal house (such as a poultry house). The vents are generally located in the roof, ceiling, or sidewalls of the animal house. Each vent contains louvers or blades which are moved from a closed position and an open position. In the open position, the vent will allow fresh air to enter the animal house to help ventilate the animal house.

Typical ceiling vents allow the cool air to simply drop into the animal house. This does not provide for an efficient flow and circulation of air within the animal house. It would be beneficial to provide a vent which will better direct the air which enters the animal house.

BRIEF SUMMARY OF THE INVENTION

Briefly stated, the disclosed ceiling vent assembly comprises a pair of opposed end panels and a pair of opposed side panels which define a frame. At least one louver is pivotally mounted within the frame to be movable between an open position to permit airflow through the vent assembly and a closed position blocking airflow. The louver includes an upper surface defining a curvature and decreases in thickness at an outer edge. When in an open configuration, the louver permits air to pass through the ceiling vent assembly in a directed flow associated with the curvature of the louver upper surface.

The foregoing features, and advantages set forth in the present disclosure as well as presently preferred embodiments will become more apparent from the reading of the following description in connection with the accompanying drawings.

BRIEF DESCRIPTION OF THE SEVERAL VIEWS OF THE DRAWINGS

In the accompanying drawings which form part of the specification:

FIG. 3 is a bottom perspective view of the vent assembly showing an open louver of the vent assembly;

FIG. 4 is an end elevational view of the vent assembly with one louver in an opened position and a second in a closed position;

FIG. 5 is a vertical cross-sectional view of the vent assembly showing one louver in an opened position and another louver in a closed position, and showing air flow through the opened louver of the vent assembly;

FIG. 6 is a perspective view of the vent assembly with one louver removed and a side panel removed to show the sealing of the louver against the end panel and to show a pulley assembly of the vent assembly;

FIGS. 9A-C show various coupling configurations for controlling the opening and closing of a plurality of vent assemblies;

Figure 1:
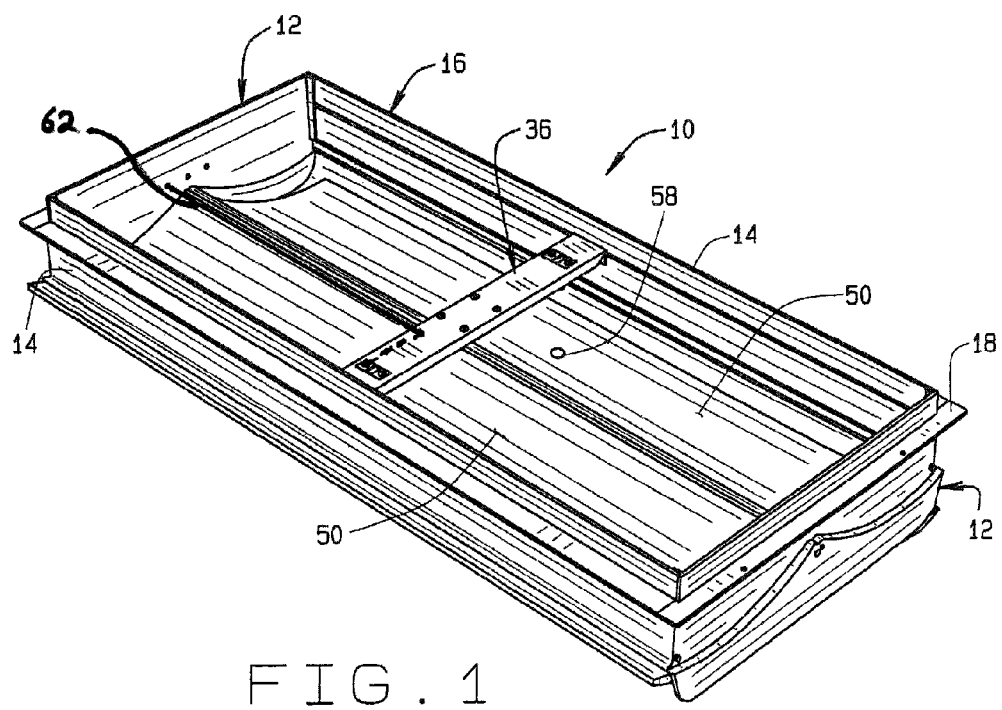
FIG. 1 is a perspective view of a first embodiment of a vent assembly.

Corresponding reference numerals indicate corresponding parts throughout the several figures of the drawings. It is to be understood that the drawings are for illustrating the concepts set forth in the present disclosure and are not to scale. Before any embodiments of the invention are explained in detail, it is to be understood that the invention is not limited in its application to the details of construction and the arrangement of components set forth in the following description or illustrated in the drawings.

DETAILED DESCRIPTION

The following detailed description illustrates the invention by way of example and not by way of limitation. This description will clearly enable one skilled in the art to make and use the invention, and describes several embodiments, adaptations, variations, alternatives and uses of the invention, including what I presently believe is the best mode of carrying out the invention. Additionally, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

Figure 2:
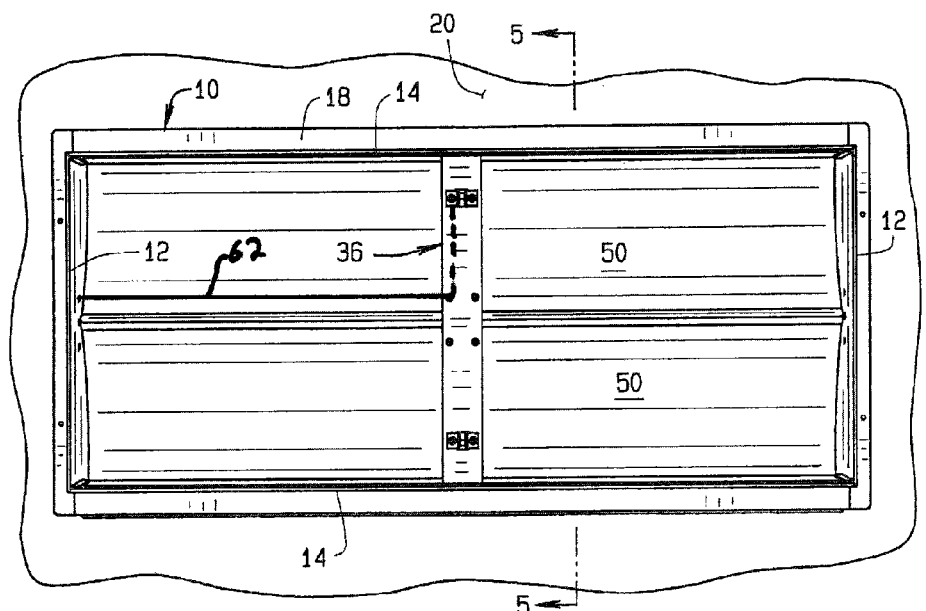
FIG. 2 is a top plan view of the vent assembly mounted in a ceiling.

A first illustrative embodiment of a vent assembly 10 is shown generally in FIGS. 1-6. The vent assembly 10 comprises a pair of opposed end panels 12 and a pair of opposed side panels 14 which, in combination, define a frame 16 which is open at its top and bottom. As seen, the frame 16 is generally quadrilateral in shape. The frame may be made from a variety of materials, including metal and/or plastic. The end panels 12 and side panels 14 can be independent pieces which are assembled together to form the frame 16. Alternatively, the frame 16 can be a one-piece, unitary element of the vent assembly 10. A flange 18 extends around the frame 16 and is spaced slightly below the top edge of the end and side panels 12 and 14. The flange 18 is a mounting flange which rests on an upper surface of a ceiling 20 in which the vent assembly 10 is installed, as seen in FIG. 2.

Figure 7A:
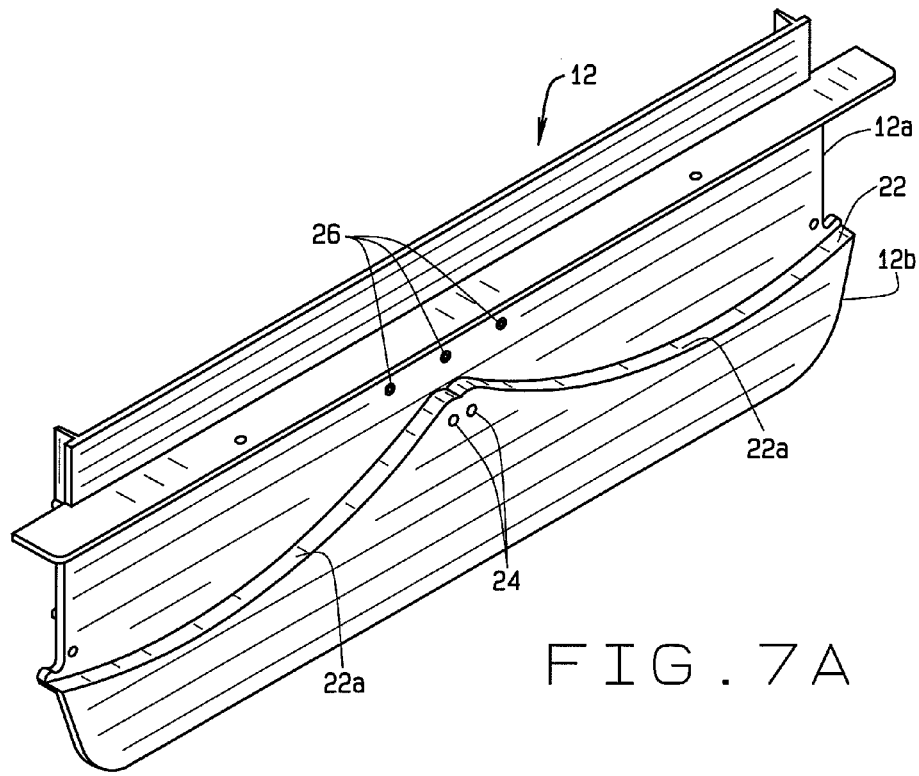
FIGS. 7A-C are outer, inner, and end perspective views, respectively, of an end panel of the vent assembly.
Figure 7B:
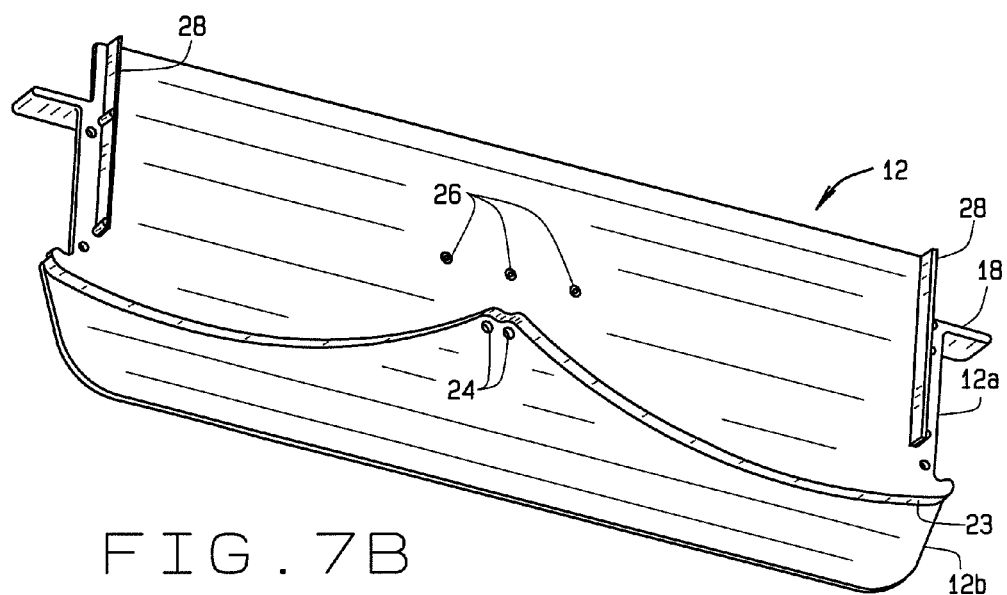
Figure 7C:
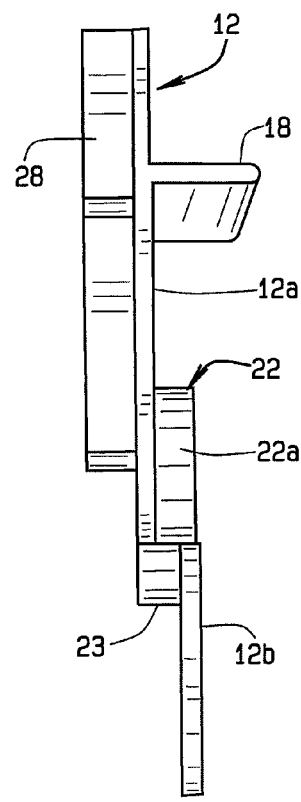

The end panels 12 are shown in detail in FIGS. 7A-C are identical. Each end panel 12 includes an upper portion 12a and a lower portion 12b separated by an outwardly extending shoulder 22 on the outer surface of the end panel. The end panel 12 is of generally constant width, and thus, a corresponding shoulder 23 is formed on the inner surface of the end panel. The shoulder 22 is defined by a pair of curved shoulder segments 22a which are the mirror image of each other. The shoulder segments 22a meet at a mid-point along the length of the end panel 12, and curve downwardly and outwardly from the midpoint. Towards the outer end of the shoulder 22, the shoulder segments 22a curve slightly upwardly. The curvature of the shoulder segments 22a is smooth and continuous, with the outer ends of the shoulder segments 22a being vertically below the inner end of the shoulder segments 22a. The outer ends of the shoulder segments 22a are approximately even with the bottom of the side panels 14.

A pair of openings 24 extends through the end panel lower portion 12b slightly below the junction of the two shoulder segments 22a. The two openings 24 define a line which is generally parallel to the flange 18. A series of openings 26 are formed above the shoulder 22 and below the flange 18. The openings 26 are shown to be arranged in a line that is generally parallel with the flange 18 and positioned in the approximate center of the end panel 12. However, the openings 26 could be arranged and positioned differently if desired. Although three openings are shown, more or fewer openings could be used, if desired. Lastly, the end panel 12 includes mounting flanges 28 extending inwardly from the end panel inner surface and spaced inwardly slightly from the side edges of the end panel 12. The mounting flanges 28 are used to facilitate connection of the end panels 12 and the side panels 14. As can be seen, the end panels 12 are symmetrical about a vertical axis which extends through the junction between the two shoulder segments 22a and through the middle opening 26.

The side panels 14 are identical to each other. Each side panel 14 includes an outwardly, and slightly upwardly, extending flange 30 (FIG. 5) at the bottom of the side panel. The flange 30 defines a channel 32 that extends the length of the side panel 14. The bottom edge 34 of the side panel 14 is, in cross-section, smoothly curved, rolled, or radiused, as best seen in FIG. 5.

In a first embodiment, a pulley assembly 36 (shown best in FIGS. 5 and 6) extends across the frame 16 between the side panels 14, generally at the mid-point along the length of the vent assembly 10. The pulley assembly 36 includes a mounting bar 38 which is fixed to the side panels 14 in any desired manner, such as by gluing, welding, bolting, riveting, etc. A vertically oriented pulley 40 is spaced inwardly from each end of the mounting bar 38, with the pulleys 40 being suspended below the mounting bar 38. A pair of horizontally oriented pulleys 42 is spaced outwardly from the approximate center of the mounting bar, such that each horizontal pulley 42 is generally aligned with one of the openings 26 in the end panel 12. The horizontal pulleys 42 are contained within a pulley housing or bracket 44 which suspends the horizontal pulleys 42 beneath the mounting bar 38. The horizontal pulleys 42 and vertical pulleys 40 are all spaced below the mounting bar 38 by approximately the same distance to be generally horizontally aligned with each other.

A pair of louvers or doors 50 is pivotally mounted in the frame. The louvers 50 are identical and extend between the end panels 12. Each louver 50 has an upper surface 52 and a lower surface 54. The louver upper surface 52 defines a continuous curve from the inner edge to the outer edge of the louver 50. The curvature of the upper surface 52 conforms to the curvature of the shoulder segments 23 on the inside surface of each side panel 14. The louver bottom surface 54 defines a curved portion 54a which extends most of the length of the louver 50, such that, for most of the length of the louver, the louver is of generally constant width. However, the outer end of the bottom surface 54b slopes upwardly so that the louver 50 tapers (i.e., reduces in width) toward its outer edge 56, as best seen in FIG. 5. As seen, the outer edge 56 of the louver 50 is radiused or rounded in cross-section. Lastly, the louver 50 includes a hole 58 at the approximate center (length-wise) of the louver 50. The pulley assembly 36 is mounted to the frame to be vertically above the louver hole 58.

The louver 50 is pivotally mounted in the frame to be movable between an open position and a closed position by means of pivot pins which extend from the opposite edges of the louvers at the inner end 60 of the louvers. Thus, the louvers 50 pivot about their inner edges. The pins extend through the openings 24 in the end panels 12 and can be integral with the louvers 50, or can comprise rods or screws which extend through the openings 24 into the end edge of the louver 50. The pins could be integrally formed with the end panels, and be received in holes in the edges of the louvers 50.

The vent assembly 10, as noted above, is mounted in a ceiling 20 with the louvers 50 at the bottom of the vent assembly, as seen in FIG. 5. The louvers are moved to the open position under gravity. The louvers 50 can be closed by means of a cord, string, rope or the like 62. The cord will be connected to the louver 50 at one end, such as by extending through the louver hole 58 and being knotted on the bottom surface of the louver 50. The rope will extend up from the louver 50, pass over the vertical pulley 40, around the horizontal pulley 42 and out one of the holes 26 in one of the end panels 12 to a position where it can be reached by an operator. The operator can then pull the rope to close the louver 50 and release the rope to allow the louver to open under the force of gravity.

As shown in FIG. 5 and FIG. 6, each louver 50 extends between the end panels 12. In the closed position, the end edges of the louver upper surface 52 are received by the shoulder 23 in the end panel inner surface and the upper surface abuts the bottom of the side panels along the outer edge 34 of the louver. As seen in FIG. 5, the louvers 50 extend beyond the side panels 14. In this manner, the louvers 50 seal against the frame 16 to substantially prevent air from passing through the vent assembly 10 when the louvers 50 are in the closed position. If desired, a sealing material, such as a deformable foam or felt could be positioned on the louver upper surface to ensure a tighter seal between the louver and the frame.

When the vent assembly 10 is opened (i.e., when the louvers 50 are lowered), air will pass downwardly through the vent assembly into the animal house. Due to the shape of the louvers 50 and the radiused bottom edge 34 of the side panels 14, the air passing through the ceiling vent assembly 10 will not simply drop down in to the animal house. Rather, the shape of the louvers and the radiused edge 34 of the side panels 14 will tend to force the air outwardly and slightly upwardly so that the air moves across the ceiling of the animal house and then down the side walls of the animal house. When the air flows down the inside of the side panel 14, the radiused bottom edge 34 of the side panel 14 causes the air to move around the bottom edge of the side panel, and hence to move outwardly along the ceiling, rather than downwardly into the animal house. Additionally, air moving along the louver 50 will be directed in an arc defined by the curvature of the louver upper surface 52 against which the airflow passes. The reduced thickness of the louver at the outer edge of the louver causes the air to come off the outer edge of the louver with a reduced turbulence, in a similar manner to the way air flows off the end of an air foil. Because of this reduced turbulence at the end of the louver, air will be directed generally outwardly and horizontally along the ceiling and away from the ceiling vent assembly 10. The air flow through the vent assembly 10 is shown schematically in FIG. 5 by the arrows A.

Figure 8A:
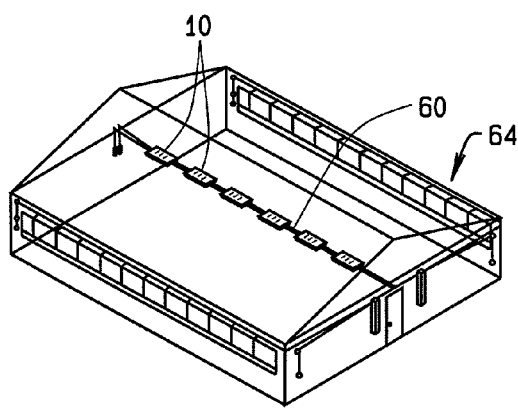
FIGS. 8A and 8B show exemplary placement of a plurality of vent assemblies mounted in a roof of an animal house.
Figure 8B:
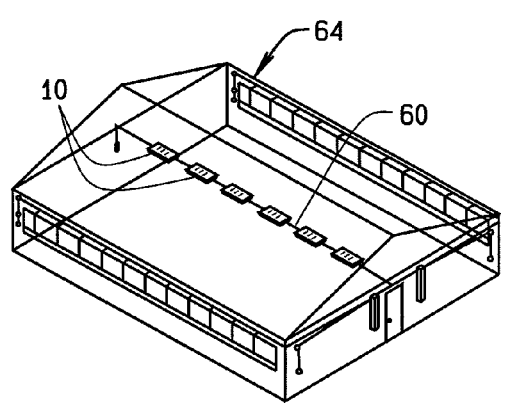

FIGS. 8A-B schematically show a series of ceiling vents 10 mounted in the ceiling of an animal house 64. As seen, the cord 62 extends between the vent assemblies 10 so that a plurality of vent assemblies 10 can be opened or closed together. FIGS. 9A-C show three different ways of interconnecting the vent assemblies. In FIG. 9A, a single main cord extends through the frames of the vent assemblies, and secondary cords extend from main cord to the louvers 50 of each vent assembly 10. Here, the louvers 50 of each vent assembly 10 will open or close together. That is, when the main cord is released, both louvers 50 of all the vent assemblies 10 will move to the opened position, and when the main cord is pulled, both louvers of all the vent assemblies will move to the closed position. In FIG. 9B, two main cords are provided. One main cord controls the louvers 50 on one side of the vent assemblies 10 and the other main cord controls the louvers 50 on the opposite side of the vent assemblies 10. In this set-up, all the right side louvers open and close together and all the left side louvers open and close together. However, the right side louvers can be opened while the left side louvers are closed, and vice versa. FIG. 9C also presents a set-up which uses two main cords. In this set-up, the louvers of a single vent assembly open and close independently, as in the arrangement of FIG. 9B, however, the louvers of adjacent vent assemblies open and close in an alternating manner. That is, when the left louver of one vent assembly is opened, the left louvers of the two adjacent vent assemblies are closed.

Figure 10A:
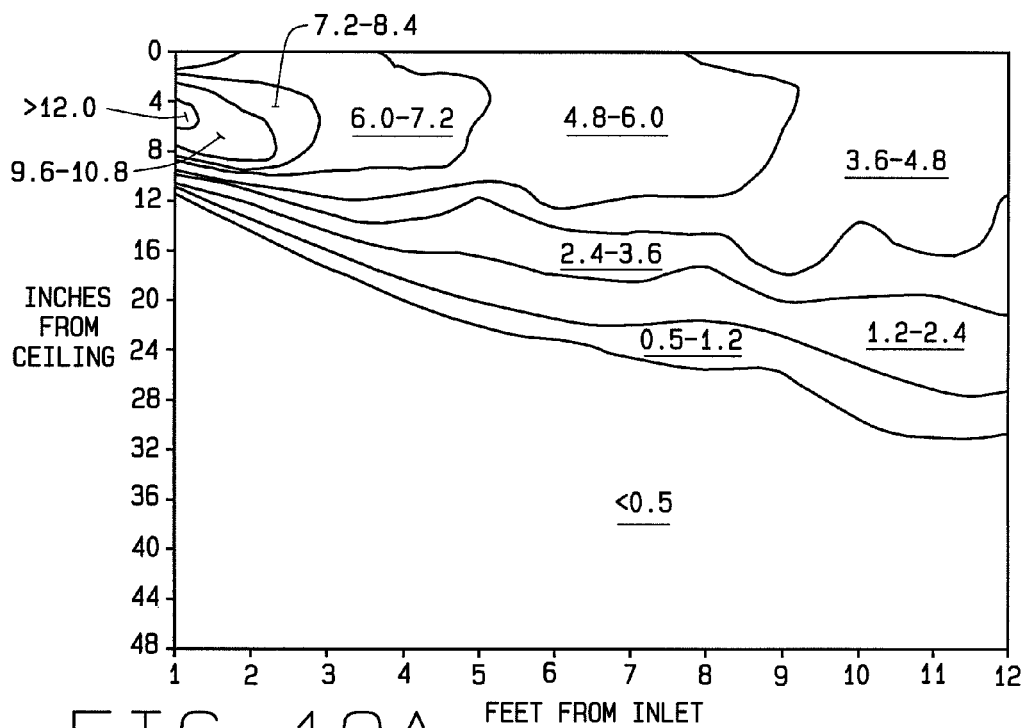
FIGS. 10A-C are charts graphing the velocity of air exiting the vent assembly for different inlet air flow (in cubic feet per minute (CFM)) and for vent assemblies opened to different degrees and which are slightly different in size.
Figure 10B:
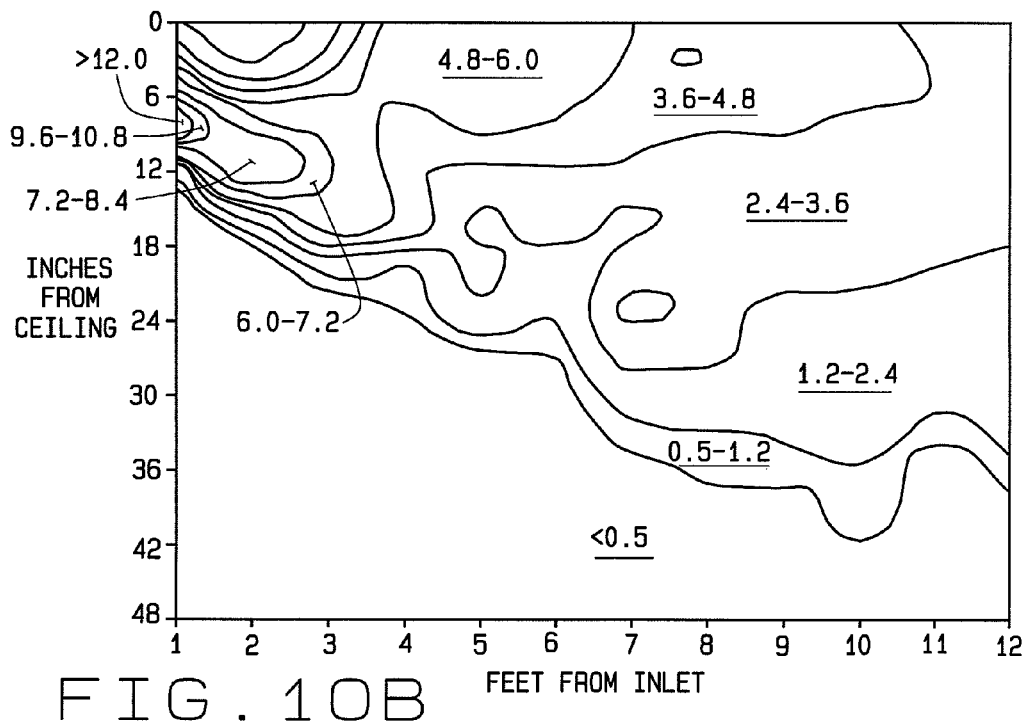
Figure 10C:
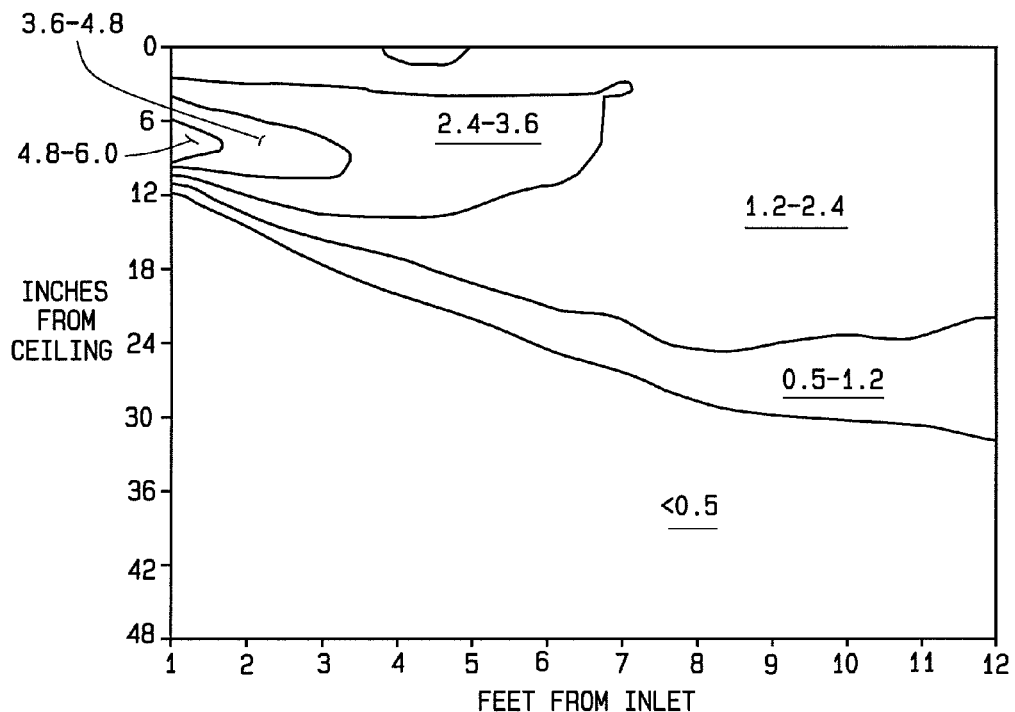
Figure 11:
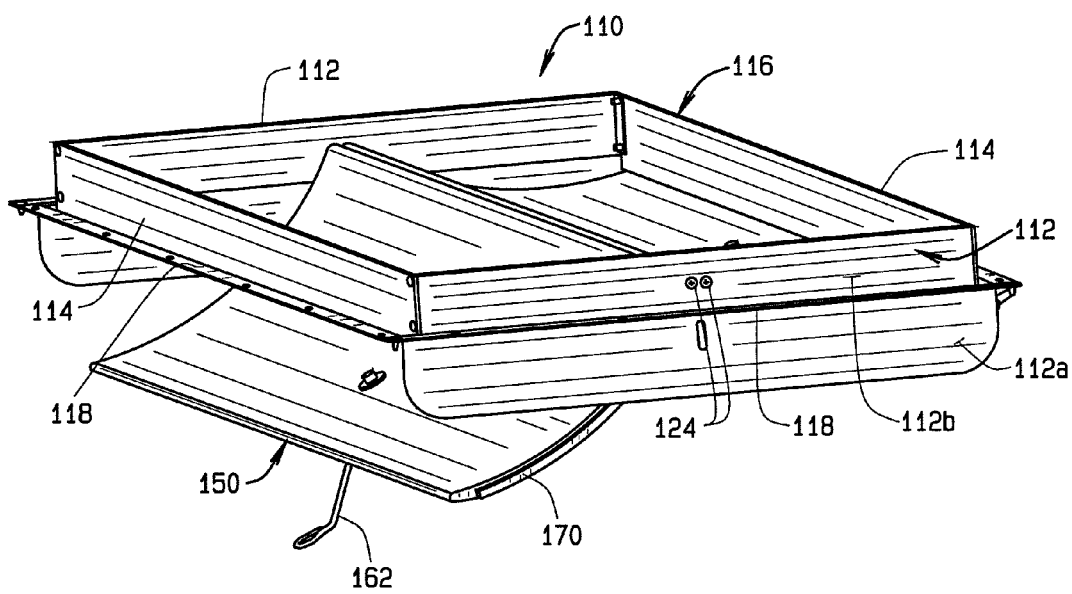
FIG. 11 is a perspective view of a second embodiment of the vent assembly.
Figure 12:
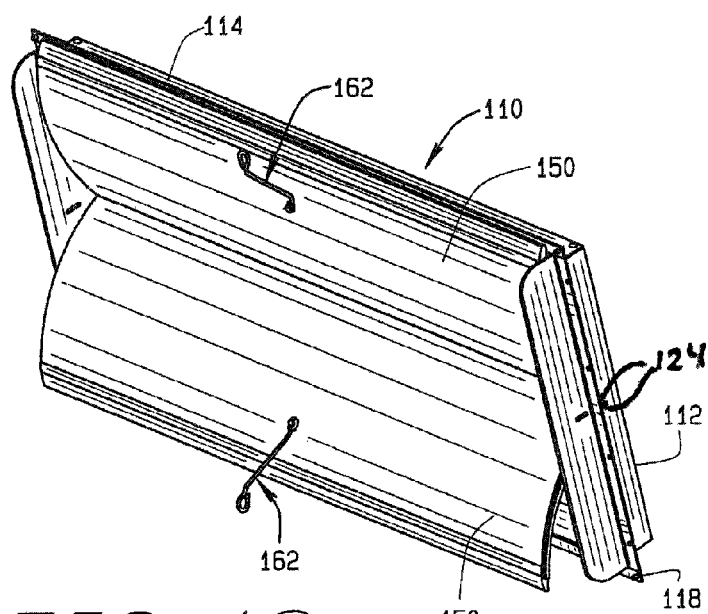
FIG. 12 is a bottom perspective view of the vent assembly of FIG. 11.
Figure 13:
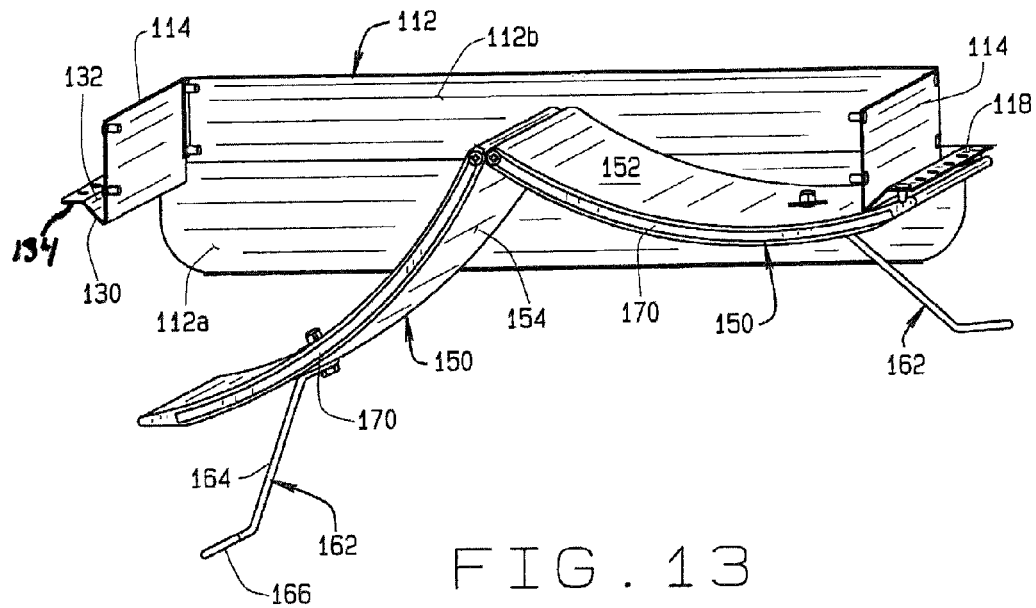
FIG. 13 is a perspective view of the vent assembly of FIG. 11 with an end panel removed.

The graphs of FIGS. 10A-C demonstrate the effectiveness of the vent assembly 10. These graphs chart air velocity in the area extending outwardly and below the vent assembly. The chart of FIG. 10A shows the velocities of air passing through an exemplary configuration of the ceiling vent 10 at a rate of 2335 cfm through a 4"×44" opening (i.e., the vent assembly is 44" long and the louver 50 is opened to define a 4" gap between the louver and the bottom edge of the side panel 14). The chart of FIG. 10B shows the velocities of air passing through a second exemplary configuration of the ceiling vent 10 at a rate of 1581 cfm and through an opening of 2"×45.5". Lastly, the chart of FIG. 10C shows the velocities of air passing through a third exemplary configuration of the ceiling vent 10 at a rate of 2373 cfm and through an opening of 3.5"×45.5". As seen in each of the charts, the air with the highest velocities is closest to the ceiling, and the higher air velocities extend more horizontally outwardly from the vent assembly than vertically downwardly. This demonstrates that the air exiting the vent assembly move along the ceiling towards the walls of the animal house, rather than generally downwardly.

The air flow through the vent assembly can be ambient air flow, but is preferably generated by a fan or fans. The fan can be located in a space above the ceiling 20, in which case, the fan would be forcing air into the attic space and through the vent assembly. Conversely, and preferably, the fan or fans are mounted in walls below the ceiling and are operated to force air out of the animal house. This will create a pressure differential between the space above the ceiling and the room below the ceiling (as seen in FIGS. 8A and B), with the attic space being at a higher pressure. Hence, air will be drawn from the attic space, through the vent, and into the room below the ceiling.

As noted above, the radiused edge of the side panel 14 defines a channel 32 extending along the side panel. Moisture often condenses on ceiling vents in animal houses, and the moisture drips off the ceiling vent to the floor of the animal house below the ceiling vent. In the vent assembly 10, condensed moisture on the outer surfaces of the side panels 14 will be collected in channels 32 formed by the radiused edges 30, best seen in FIG. 5. The moisture in the channels will subsequently evaporate, reducing the amount of moisture which drops off the ceiling vent to the floor below.

The major components of the ceiling vent 10 (i.e., the side and end panels, the louvers, and the pulley assembly) can all be formed from metal or molded from plastic. In fact, the side panels 14 and the louvers 15 could be formed by an extrusion process, allowing for the length of the vent assembly 10 to be custom sized.

A second embodiment of the attic vent is shown in FIGS. 11-15. The vent assembly 110 is substantially similar to the vent assembly 10. However, the main components of the vent assembly 110 are made from metal as opposed to plastic. The vent assembly 110 comprises a pair of opposed end panels 112 and a pair of opposed side panels 114 which, in combination, define a frame 116 which is open at its top and bottom. A flange 118 extends around the frame 116 and is spaced slightly below the top edge of the end and side panels 112 and 114. As will be described below, the portion of the flange 118 extending along the side panels 114 is integral with the side panels, and the portion of the flange extending along the end panels 112 is comprised of a separate strip of metal which is secured at its opposite ends to the side panel flange segments.

The end panels 112 are identical. Each end panel 112 includes generally flat inner and outer surfaces. As seen, the end panel 112 is divided into a lower potion 112a and an upper portion 112b by the flange 118. The upper portion 112b extends between the inner edges of the flange 118. The lower portion 112a extends beyond the inner edge of the flange 118. A pair of openings 124 is formed centrally of the end panel upper portion 112b. The two openings 124 define a line which is generally parallel to, and above, the flange 118.

The side panels 114 are identical to each other. Like the end panels 112, the side panels 114 have generally flat inner and outer surfaces. The side panels have a height that is generally equal to the height of the end panel upper portion 112b. Thus, the end panel lower portion 112a extends below the bottom of the side panels 114. A flange member 130 extends upwardly and outwardly from the bottom of the end panel 114 to define a channel 132. The channel 132 collects condensation in the same manner that the channel 32 of the vent assembly 10. A second flange portion 134 extends outwardly from the flange portion 132. This flange portion 134 forms the segment of the flange 118 which extends along the side panel 114. The side panel 114 is preferably formed from a single piece of sheet metal. Hence, the flange members 130 and 134 are integral with the side panel 114.

A pair of louvers or doors 150 are pivotally mounted in the frame 116. The louvers 150 are identical. Each louver 150 has an upper surface 152 and a lower surface 154. The louver upper surface 152 defines a continuous curve from the inner edge to the outer edge of the louver 150. The louver bottom surface 154 defines a curved portion 154a which extends most of the length of the louver 150, such that, for most of the length of the louver, the louver is of generally constant width. However, the outer end of the bottom surface 154b slopes upwardly so that the louver 150 tapers (i.e., reduces in width) toward its outer edge 156. As seen, the outer edge 156 of the louver 150 is radiused. A hole 158 at the approximate center (length-wise) of the louver 150.

The louver 150 is pivotally mounted in the frame to be movable between an open position and a closed position. The louver 150 is mounted to the frame by means of pivot pins which extend from the opposite edges of the louvers at the inner end 160 of the louvers. The pins extend through the openings 124 in the end panels 112. The pins can be integral with the louvers 150 or the end panels 112, or can comprise rods or screws which extend through the openings 124 into the louver 150.

Figure 14:
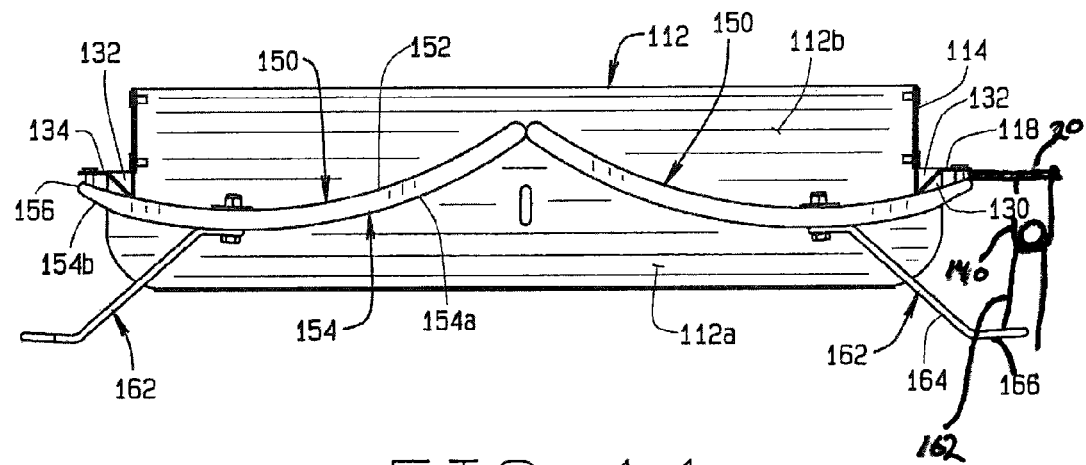
FIG. 14 is a vertical cross-sectional view of the vent assembly of FIG. 11 with both louvers in a closed position.
Figure 15:
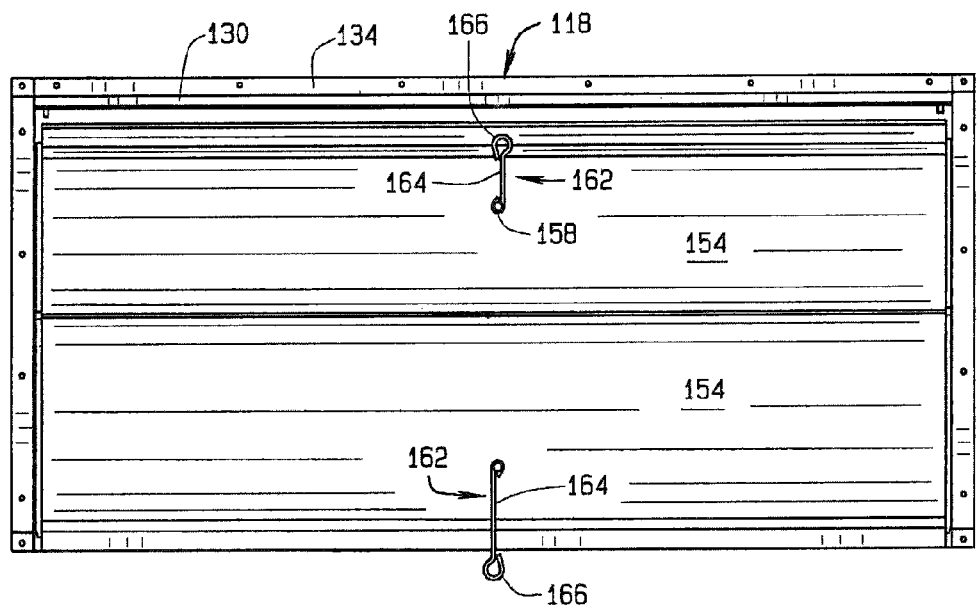
FIG. 15 is a bottom plan view of the vent assembly of FIG. 11.

The vent assembly 110 does not include a pulley assembly similar to the pulley assembly 36 of the vent assembly 10. Rather, to move the louvers 150 from the opened position to the closed position, the louvers 150 are provided with actuation brackets 162. The actuation brackets comprise an arm 164 which is mounted to the bottom surface 154 of the louver 150, for example by means of a screw or bolt passing through the louver hole 158. The bracket arm can, of course, be mounted to the louver 150 by other means, such as welding, gluing, brazing, etc. The arm extends downwardly and outwardly relative to the frame and louver, as seen in FIG. 14, with the outer end of the arm 164 being outside of the perimeter of the frame 116 when the louver 150 is closed. A loop 166 is formed at the end of the arm 164 and extends outwardly from the arm 164. A rope, cable, chain or the like 162 can be tied or otherwise connected to the bracket loop 166 and extend about a pulley 140 which is mounted in the ceiling adjacent the vent assembly 110. By pulling on the rope, the louvers 150 will be pulled to their closed position.

In the vent assembly 110, the louvers 150 are a slight bit shorter than the side panels 114, thereby forming a small gap between the end edges of the louvers and the inner surfaces of the end panels 112. A sealing strip, for example of a deformable foam, pile, or weather stripping 170 is adhered to the end edges of the louvers 150 to form a seal between the end edges of the louvers 150 and the end panels 112 when the louvers are in the closed position. In the closed position, the upper surface engages the lower edge of the side panels, as in the vent assembly 10, to form a seal between the louvers 150 and the side panels 114 when in the closed position.

Figure 16A:
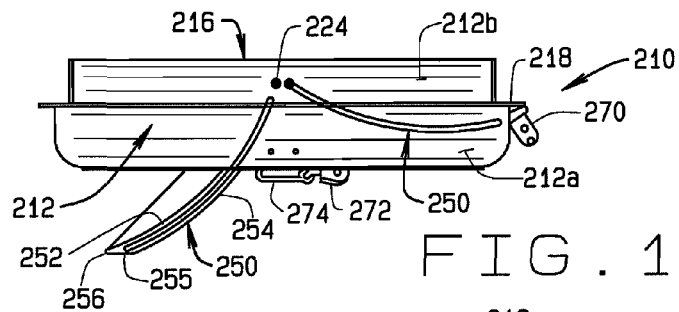
FIGS. 16A-C illustrate an end view, a perspective bottom view, and an enlargement of the bottom view of a third embodiment of the vent assembly.
Figure 16B:
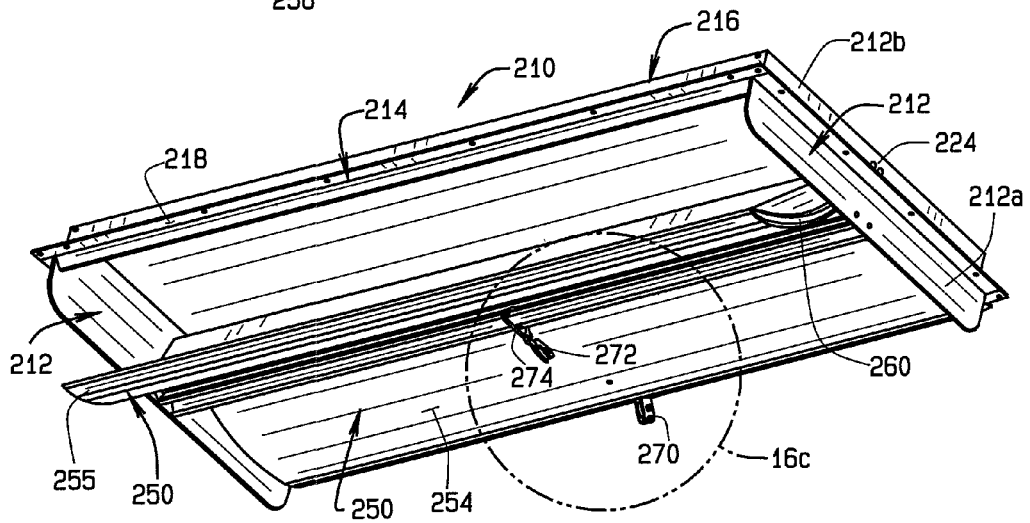
Figure 16C:
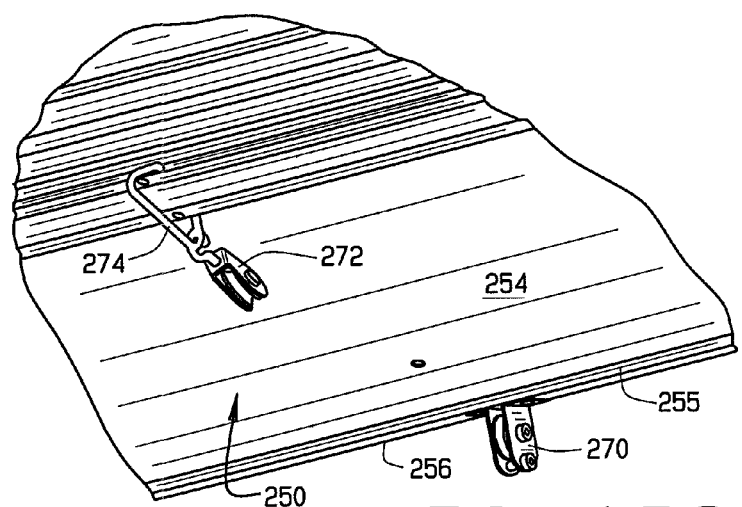

A third embodiment of the ceiling vent assembly is shown in FIGS. 16A-16C. The ceiling vent assembly 210 is substantially similar to the vent assemblies 10 and 110, and the main components may be made from either metal or plastic. The vent assembly 210 comprises a pair of opposed end panels 212 and a pair of opposed side panels 214 which, in combination, define a frame 216 which is open at its top and bottom. A flange 218 extends around the frame 216 and is spaced slightly below the top edge of the end and side panels 212 and 214. As will be described below, the portion of the flange 218 extending along the side panels 214 is integral with the side panels, and the portion of the flange extending along the end panels 212 is comprised of a separate strip of metal which is secured at its opposite ends to the side panel flange segments.

The end panels 212 are identical. Each end panel 212 includes generally flat inner and outer surfaces. As seen, the end panel 212 is divided into a lower potion 212a and an upper portion 212b by the flange 218. The upper portion 212b extends between the inner edges of the flange 218. The lower portion 212a extends beyond the inner edge of the flange 218. A pair of openings 224 is formed centrally of the end panel upper portion 212b. The two openings 224 define a line which is generally parallel to, and above, the flange 218.

The side panels 214 are identical to each other. Like the end panels 212, the side panels 214 have generally flat inner and outer surfaces. The side panels have a height that is generally equal to the height of the end panel upper portion 212b. Thus, the end panel lower portion 212a extends below the bottom of the side panels 214. The flange 218 may be formed to define a channel to collect condensation in the same manner as the channel 32 of the vent assembly 10.

A pair of louvers or doors 250 are pivotally mounted in the frame 216. The louvers 250 are identical. Each louver 250 has an upper surface 252 and a lower surface 254. The louver upper surface 252 defines a continuous curve from the inner edge to the outer edge of the louver 250. The louver bottom surface 254 defines a curved portion which extends most of the length of the louver 250, such that, for most of the length of the louver, the louver is of generally constant width. However, the outer end of the bottom surface 255 slopes upwardly so that the louver 250 tapers (i.e., reduces in width) toward its outer edge 256. As seen, the outer edge 256 of the louver 250 is radiused.

Each louver 250 is pivotally mounted in the frame to be movable between an open position and a closed position. The louver 250 is mounted to the frame by means of pivot pins which extend from the opposite edges of the louvers at the inner end 260 of the louvers. The pins extend through the openings 224 in the end panels 212. The pins can be integral with the louvers 250 or the end panels 212, or can comprise rods or screws which extend through the openings 224 into the louver 250.

As best seen in FIG. 16C, which is illustrating one louver 250, the vent assembly 210 is operated to move the louvers 250 from the opened position to the closed position by a cable and pulley assembly consisting of a cable, rope, or chain which runs below the vent assembly 210 and restrains each louver 250 from below. One end of the cable, rope, or chain is secured to the supporting structure (ceiling) adjacent to the side panel 214, and is passed through a pulley 270 secured to the bottom surface 255 of the louver 250. From the pulley 270, the cable, rope, or chain is passed below the lower surface 254 of the louver to a second pulley 272 which is freely coupled to a D-ring 274 disposed below the mid-line of the vent assembly. From the second pulley 272, the cable, rope, or chain is routed to an area accessible by an operator.

By pulling on the cable, rope, or chain the louvers 250 will be pulled to their closed position by the tensioning between the fixed end and the second pulley 272 in the cable, rope or chain. To open the louvers 250, the tension on the cable, rope, or chain is released, and slack is permitted between the fixed end and the second pulley 272, allowing the louver 250 to drop downward due to the force of gravity, and guided by the action of pulley 270 along the cable, rope, or chain. Those of ordinary skill will recognize that while FIGS. 16A-16C illustrate the placement of the first and second pulleys 270 and 272 for a louver 250 on only one side of the vent assembly 210, that these components may be duplicated on the opposite side of the vent assembly 210 to operate the second louver 250.

Within the vent assembly 210, the louvers 250 are a slight bit shorter than the side panels 214, thereby forming a small gap between the end edges of the louvers and the inner surfaces of the end panels 212. A sealing strip, for example of a deformable foam, pile, or weather stripping may be adhered to the end edges of the louvers 250 to form a seal between the end edges of the louvers 250 and the end panels 212 when the louvers are in the closed position. In the closed position, the upper surface engages the lower edge of the side panels, as in the vent assembly 210, to form a seal between the louvers 250 and the side panels 214 when in the closed position.

As various changes could be made in the above constructions without departing from the scope of the disclosure, it is intended that all matter contained in the above description or shown in the accompanying drawings shall be interpreted as illustrative and not in a limiting sense.

The invention claimed is:

1. A ceiling vent assembly comprising:
a frame comprising a pair of opposed end panels and a pair of opposed side panels; said side and end panels each having an upper edge and a lower edge; said frame being open at a top and a bottom thereof;
at least one louver mounted in said frame to pivot about a pivot axis between an open position wherein air can flow through and exit said ceiling vent assembly and a closed position wherein the open bottom of said frame is substantially closed to substantially prevent air from flowing through and exiting said ceiling vent assembly; said louver having an inner edge, an outer edge, opposed end edges, an upper surface and a lower surface; said louver upper surface defining a continuous concave curve which extends substantially between the opposed end edges and substantially from said inner edge to said outer edge of the louver; said louver lower surface having a first major portion extending from the inner edge of said louver substantially toward the outer edge of the louver and a second edge portion which extends from the first portion to the outer edge of the louver; the first portion having a curvature substantially matching the curvature of the louver upper surface to define a major portion of the louver having a generally constant thickness; said second portion of said louver lower surface defining a sloped surface to such that said edge portion of said louver has a decreasing in thickness; and
wherein said louver is mounted in said frame such that air exiting said ceiling vent assembly travels along said concave upper surface of said louver; said curvature of said louver upper surface being shaped and configured to direct air flow generally outwardly and horizontally along a ceiling in which said vent assembly is mounted and said airflow moving away from the ceiling vent assembly when said louver is disposed in an open position.

2. The ceiling vent assembly of claim 1 wherein said louver outer edge is rounded in cross-section.

3. The ceiling vent assembly of claim 1 wherein the lower edge of said side panels of said frame is curved in cross-section.

4. The ceiling vent assembly of claim 1 including an upwardly extending channel extending along an outer surface of said frame; said channel being positioned on said outer surface of said frame to be spaced below a lower surface of a ceiling when said ceiling vent assembly is mounted in a ceiling.

5. The ceiling vent assembly of claim 1 including a pulley assembly for operation of a single louver through which a rope is threaded; said rope being connected at one end to said louver, said rope passing through said frame, and said rope having a second end positioned to be accessible by an operator; whereby, said louver is moved to its closed position by pulling the rope and moved to its opened position under force of gravity by releasing the rope.

6. The ceiling vent assembly of claim 1 including a pulley assembly for operation of a single louver through which a rope is threaded; said rope being connected at one end to a ceiling surface adjacent to a side panel of said frame, said rope passing through a first pulley secured adjacent the outer edge of said louver and traversing below said lower surface of said louver to a second pulley secured to a longitudinal midline support member of said frame; and said rope having a second end positioned to be accessible by an operator;
whereby tension in said rope between said connected end at said ceiling surface and said second pulley maintains said louver in said closed position; and
whereby, said louver is moved from said closed position to said open position under force of gravity by releasing tension in said rope.

7. A ceiling vent assembly comprising:
a pair of opposed end panels and a pair of opposed side panels; said end panels and side panels defining a frame; said side and end panels each having an upper edge and a lower edge; said frame being open at a top and a bottom thereof;
at least one louver pivotally mounted in said frame to be movable between an open position wherein air can flow through and exit said ceiling vent assembly and a closed position wherein the open bottom of said frame is substantially closed to substantially prevent air from flowing through and exiting said ceiling vent assembly; said louver having an inner edge, an outer edge, opposed end edges, an upper surface and a lower surface; said louver upper surface having a curvature defining a continuous convex curve extending substantially between the opposed end edges and substantially from said inner edge to said outer edge of the louver;
said vent assembly including means for directing air exiting said vent assembly generally outwardly and horizontally along a ceiling in which said vent assembly is mounted and away from the ceiling vent assembly and means for minimizing turbulence of the air exiting the vent assembly; said means comprising said upper surface; said outer edge, and cross-sectional shape of an end portion of said louver; wherein said outer edge is radiused and said end portion extends from said outer edge toward said inner edge; said end portion increasing in thickness from said outer edge toward said inner edge to a maximum thickness; said end portion having a length substantially shorter than the inner edge-to-outer edge length of said louver.

8. The vent assembly of claim 7 wherein said air directing means further comprises the bottom edge of said side panels; said side panel bottom edge being curved in cross-section.

9. A ceiling vent assembly, comprising:
a rectangular frame configured for attachment to a supporting ceiling structure, said frame including first and second transverse ends and first and second longitudinal sides; said frame being open at a top and a bottom thereof;
a pair of louvers pivotally mounted between said first and second transverse ends, each louver of said pair of louvers defining an inner edge, an outer edge and opposed side edges; each louver of said pair of louvers being pivotable about a longitudinal axis which is proximate said inner edge of said louvers and is generally parallel to said longitudinal sides of the frame; the longitudinal axes of said louvers being positioned approximately mid-way along said transverse ends of said frame; each of said louvers being pivotable between a closed position in which an upper surface of said louvers abuts a bottom edge of said longitudinal sides of the frame to substantially prevent air from flowing through and exiting said ceiling vent assembly and an open position in which said upper surface of said louver is displaced from said bottom edge of said longitudinal side of the frame to allow air to exit said vent assembly through the bottom of said vent assembly; said upper surface of each of said louvers defining a continuous concave curve extending substantially from said inner edge to said outer edge of the louver and extending substantially between the opposed side edges of said louver; said outer edge of said louvers being rounded in cross-section; and wherein said rounded outer edges of said louvers and said concave curvature of said upper surfaces of said louvers cooperate to direct a flow of air entering said ceiling vent assembly from above said louvers generally outwardly and horizontally along a ceiling in which said vent assembly is mounted and away from the ceiling vent assembly when at least one of said louvers is in an open position.

10. The vent assembly of claim 9 wherein said bottom edge of each of said first and second longitudinal sides of said frame includes an outwardly-directed curved flange defining a rolled edge.

11. The vent assembly of claim 9 wherein said bottom edge of each of said first and second longitudinal sides includes an outwardly-directed flange defining a channel adjunct said bottom edge of each of said first and second longitudinal sides.

12. The vent assembly of claim 9 wherein each of said louvers includes a tapered end portion extending the width of said louver from one side edge to the other side edge; said tapered end portion extending from said outer edge toward said inner edge a determined length; said determined length of said tapered outer portion being substantially less than an overall length of said louver from said inner edge to said outer edge; said louvers being of substantially constant thickness from an inner end of said tapered portion to said inner edge of said louver; said tapered outer portion in part directing an airflow passing between said bottom edge of said longitudinal side and said louver generally outwardly and horizontally along the ceiling and away from the ceiling vent assembly when said louver is in an open configuration.

13. The vent assembly of claim 9 wherein each of said louvers is independently movable from said open position to said closed position.

14. The vent assembly of claim 9 further including a rope and pulley system for selectively opening or closing said louvers, said rope and pulley system including at least one pulley and at least one rope passing through said at least one pulley and having an end fixed to either one of said louvers or a support for said vent assembly, said at least one pulley being positioned and said rope being threaded such that the position of said louver is responsive to tension in said rope.

15. The vent assembly of claim 14 wherein a fixed end of said rope is secured to said louver such that tension on said rope moves said louver to said closed position; and whereby release of tension on said rope enables a force of gravity to move said louver to said open position.

16. The vent assembly of claim 14 wherein a fixed end of said rope is secured to a fixed structure adjacent to said louver and is passed through a first pulley disposed below said outer edge of said louver to a second pulley coupled to a fixed support adjacent said longitudinal midline of said frame, below said louver rotational axis, whereby tension on said rope moves said louver to said closed position; and whereby release of tension on said rope enables a force of gravity to move said louver to said open position, regulated by contact between said rope and a lower surface of said louver.

17. A ceiling vent assembly for regulating airflow entering a structure, comprising:
    a frame structure adapted for fitted attachment within an opening of the structure; said frame being open at a top and bottom thereof;
    at least one louver disposed within said frame structure and having an upper surface, a lower surface, an inner edge, an outer edge and opposed side edges, said louver adapted for pivotal movement about a longitudinal axis of rotation which is adjacent an inner longitudinal edge of the louver, said pivotal movement altering a position of said louver from a closed configuration wherein an outer longitudinal edge is in abutting contact with a bottom edge of said frame structure to substantially prevent air from exiting said ceiling vent assembly to an open configuration providing an airflow gap between an upper surface of said louver and said bottom edge of said frame; and
    wherein said louver upper surface and lower surface define a thickness of said louver; said louver defining a first portion of generally constant thickness extending from said inner edge toward said outer edge and an end portion extending from said first portion to said outer edge of said louver; the bottom surface in said end portion sloping upwardly toward said upper surface, such that said end portion is a portion of decreasing thickness; said upper surface defining a concave surface extending substantially between the opposed side edges of said louver and substantially from the inner edge to the outer edge of said louver; whereby, the tapered end portion directs airflow exiting the vent assembly generally outwardly and horizontally along the ceiling and away from the ceiling vent assembly when said louver is in said open configuration.

18. The ceiling vent assembly of claim 17 wherein said frame comprises a pair opposed end members and a pair of opposed side members; said ceiling vent assembly further including a second louver disposed within said frame structure, said second louver being a mirror-image of said first louver to direct, when in an open configuration, a portion of the airflow entering the structure through said ceiling vent assembly generally along said ceiling in a direction which is opposite from the portion of the directed airflow passing through said first louver opening; wherein said louvers pivot between said opened and closed configurations about pivot axes which are substantially parallel to each other, adjacent each other, and extend between the opposed side members of said frame approximately midway between said end members of said frame.

19. The ceiling vent assembly of claim 18 wherein said first and second louvers are independently adjustable between said open and closed configurations.

* * * * *